(12) United States Patent
Lavric et al.

(10) Patent No.: US 7,939,033 B2
(45) Date of Patent: May 10, 2011

(54) PROCESS INTENSIFIED MICROFLUIDIC DEVICES

(75) Inventors: Elena Daniela Lavric, Avon (FR); Pierre Woehl, Cesson (FR)

(73) Assignee: Corning Incorporated, Corning, NY (US)

( * ) Notice: Subject to any disclaimer, the term of this patent is extended or adjusted under 35 U.S.C. 154(b) by 200 days.

(21) Appl. No.: 12/171,403

(22) Filed: Jul. 11, 2008

(65) Prior Publication Data

US 2009/0028763 A1 Jan. 29, 2009

(30) Foreign Application Priority Data

Jul. 11, 2007 (EP) .................................... 07301225

(51) Int. Cl.
*B01L 3/00* (2006.01)
*B01J 8/00* (2006.01)
*B01J 19/00* (2006.01)
*B01F 13/00* (2006.01)

(52) U.S. Cl. ........ 422/503; 422/603; 422/198; 422/220; 422/222; 422/224; 366/341; 366/336

(58) Field of Classification Search .................. 422/100, 422/102, 189, 198, 215, 220, 222, 224; 366/341, 366/336

See application file for complete search history.

(56) References Cited

U.S. PATENT DOCUMENTS

| 2005/0106756 A1 | 5/2005 | Blankenstein et al. ........ 436/523 |
| 2006/0171864 A1* | 8/2006 | Caze et al. .................... 422/130 |
| 2007/0263485 A1 | 11/2007 | Yang et al. .................... 366/336 |

FOREIGN PATENT DOCUMENTS

| EP | 1531003 | 11/2004 |
| EP | 1679115 | 1/2005 |
| WO | WO 02/16017 | 2/2002 |
| WO | WO 03/103835 | 12/2003 |

* cited by examiner

*Primary Examiner* — Walter D Griffin
*Assistant Examiner* — Lessanework Seifu
(74) *Attorney, Agent, or Firm* — Gregory V. Bean (57) ABSTRACT

A microfluidic device [10] includes at least one reactant passage [26] and one or more thermal control passages defined therein, the one or more thermal control passages being positioned and arranged within two volumes [12,14] each bordered by a wall [18,20], the walls being generally planar and parallel to one another, the reactant passage positioned between said generally planar walls and defined by said generally planar walls and walls [28] extending between said generally planar walls, wherein the reactant passage comprises multiple successive chambers [34], each such chamber including a split of the reactant passage into at least two sub-passages [36], and a joining [38] of the split passages, and a change of passage direction, of at least one of the sub-passages, of at least 90 degrees.

12 Claims, 10 Drawing Sheets

PROCESS INTENSIFIED MICROFLUIDIC DEVICES

PRIORITY

This application claims priority to European Patent Application number 07301225.4, filed Jul. 11, 2007, titled "Process Intensified Microfluidic Devices."

BACKGROUND OF THE INVENTION

Microfluidic devices, as understood herein, include fluidic devices over a scale ranging from microns to a few millimeters, that is, devices with fluid channels the smallest dimension of which is in the range of microns to a few millimeters, and preferably in the range of from about 10's of microns to about 1.5 millimeters. Partly because of their characteristically low total process fluid volumes and characteristically high surface to volume ratios, microfluidic devices, particularly microreactors, can be useful to perform difficult, dangerous, or even otherwise impossible chemical reactions and processes in a safe, efficient, and environmentally-friendly way. Such improved chemical processing is often described as "process intensification."

Process intensification is a relatively new emphasis in chemical engineering which has the potential to transform traditional chemical processing, leading to smaller, safer, and more energy-efficient and environmentally friendly processes. The principal goal of process intensification is to produce highly efficient reaction and processing systems using configurations that simultaneously significantly reduce reactor sizes and maximize mass- and heat-transfer efficiencies. Shortening the development time from laboratory to commercial production through the use of methods that permit the researcher to obtain better conversion or selectivity is also one of the priorities of process intensification studies. Process intensification may be particularly advantageous for the fine chemicals and pharmaceutical industries, where production amounts are often smaller than a few metric tons per year, and where lab results in an intensified process may be relatively easily scaled-out in a parallel fashion.

Process intensification consists of the development of novel apparatuses and techniques that, relative to those commonly used today are expected to bring very important improvements in manufacturing and processing, substantially decreasing equipment-size to production-capacity ratio, energy consumption and/or waste production, and ultimately resulting in cheaper, sustainable technologies. Or, to put this in a shorter form: any chemical engineering development that leads to a substantially smaller, cleaner, and more energy efficient technology is process intensification.

Figure 1:
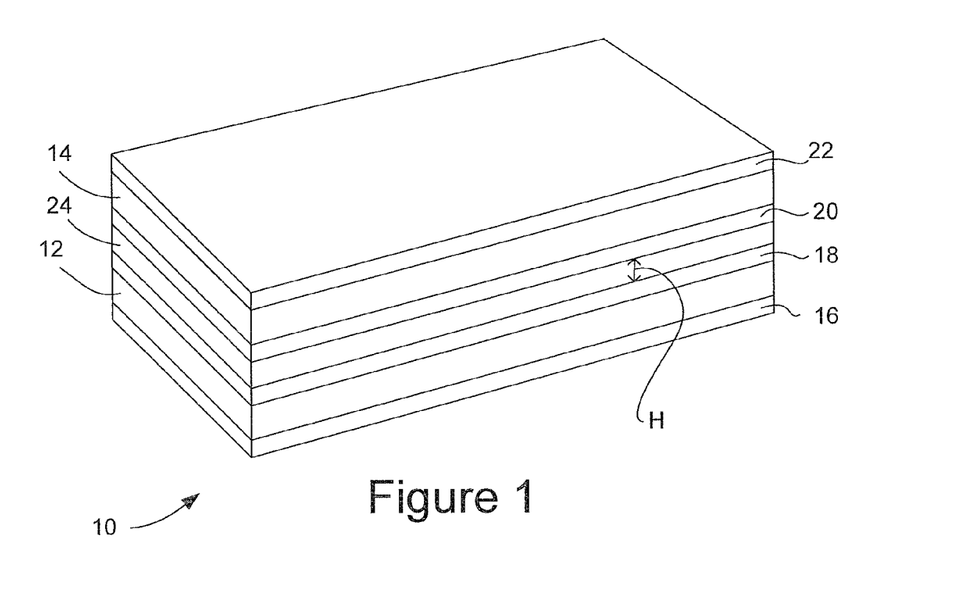
FIG. 1 is a schematic perspective showing a general layered structure of certain prior art microfluidic devices.

The present inventors and/or their colleagues have previously developed various microfluidic devices useful in process intensification and methods for producing such devices. These previously developed devices include apparatuses of the general form shown in prior art FIG. 1. FIG. 1, not to scale, is a schematic perspective showing a general layered structure of certain type of microfluidic device. A microfluidic device 10 of the type shown generally comprises at least two volumes 12 and 14 within which is positioned or structured one or more thermal control passages not shown in detail in the figure. The volume 12 is limited in the vertical direction by horizontal walls 16 and 18, while the volume 14 is limited in the vertical direction by horizontal walls 20 and 22.

The terms "horizontal" and "vertical," as used in this document are relative terms only and indicative of a general relative orientation only, and do not necessarily indicate perpendicularity, and are also used for convenience to refer to orientations used in the figures, which orientations are used as a matter of convention only and not intended as characteristic of the devices shown. The present invention and the embodiments thereof to be described herein may be used in any desired orientation, and horizontal and vertical walls need generally only be intersecting walls, and need not be perpendicular.

Figure 2:
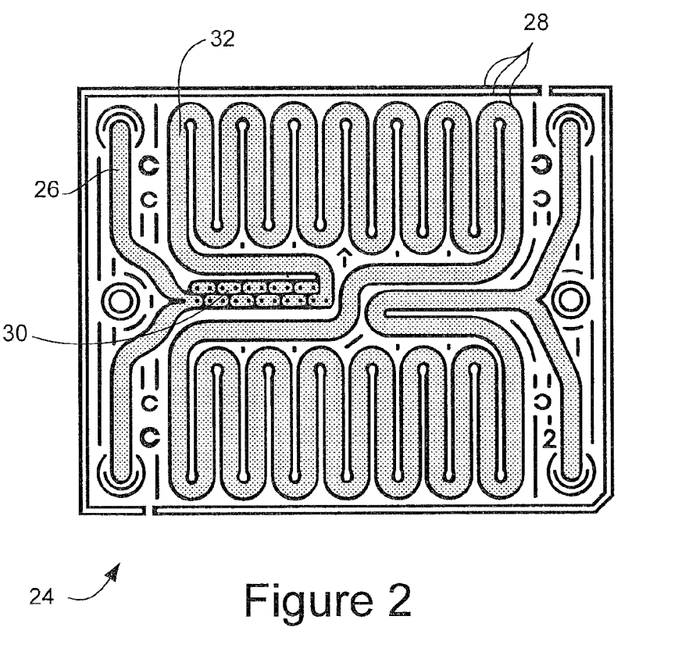
FIG. 2 is a cross-sectional plan view of vertical wall structures within the volume 24 of FIG. 1.

A reactant passage 26, partial detail of which is shown in prior art FIG. 2, is positioned within the volume 24 between the two central horizontal walls 18 and 20. FIG. 2 shows a cross-sectional plan view of the vertical wall structures 28, some of which define the reactant passage 26, at a given cross-sectional level within the volume 24. The reactant passage 26 in FIG. 2 is cross-hatched for easy visibility and includes a more narrow, tortuous passage 30 followed by a broader, less tortuous passage 32. Close examination of the narrow, tortuous passage 30 in FIG. 2 will show that the tortuous passage 30 is discontinuous in the plane of the figure. The fluidic connections between the discontinuous sections of the tortuous passage shown in the cross section of FIG. 1 are provided in a different plane within the volume 24, vertically displaced from plane of the cross-section shown in FIG. 2, resulting in a passage 30 that is serpentine and three-dimensionally tortuous. The device shown in FIGS. 1 and 2 and related other embodiments are disclosed in more detail, for example, in European Patent No. EP 01 679 115, C. Guermeur et al. (2005). In the device of FIGS. 1 and 2 and similar devices, the narrow, more tortuous passage 30 serves to mix reactants while an immediately subsequent broader, less tortuous passage 32 follows the passage 30 and serves to provide a volume in which reactions can be completed while in a relatively controlled thermal environment.

Although good performance has been obtained with devices of this type, in many cases even exceeding the state of the art for a given reaction, it has nonetheless become desirous to improve upon the thermo- and fluid-dynamic performance of such devices. In particular, it is desirable that the heat exchange performance of such devices be improved while simultaneously approximately maintaining at the same level or even decreasing the pressure drop caused by the device, while increasing mixing performance and throughput.

In U.S. Pat. No. 6,935,768 (corresponding to DE 10041823), "Method and Statistical Micromixer for Mixing at Least Two Liquids," successive expansion chambers 6 are spaced apart along a narrow channel 5, (see FIG. 2) for the purpose of generating standing vortices in the expansion chambers as an aid to mixing.

SUMMARY OF THE INVENTION

A microfluidic device includes at least one reactant passage and one or more thermal control passages defined therein, the one or more thermal control passages being positioned and arranged within two volumes each bordered by a wall, the walls being generally planar and parallel to one another, the reactant passage positioned between said generally planar walls and defined by said generally planar walls and walls extending between said generally planar walls, wherein the reactant passage comprises multiple successive chambers, each such chamber including a split of the reactant passage into at least two sub-passages, and a joining of the split passages, and a change of passage direction, of at least one of the sub-passages, of at least 90 degrees. Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Reference will now be made in detail to the presently preferred embodiments of the invention, examples of which are illustrated in the accompanying drawings. Whenever possible, the same reference numerals will be used throughout the drawings to refer to the same or like parts.

Figure 3:
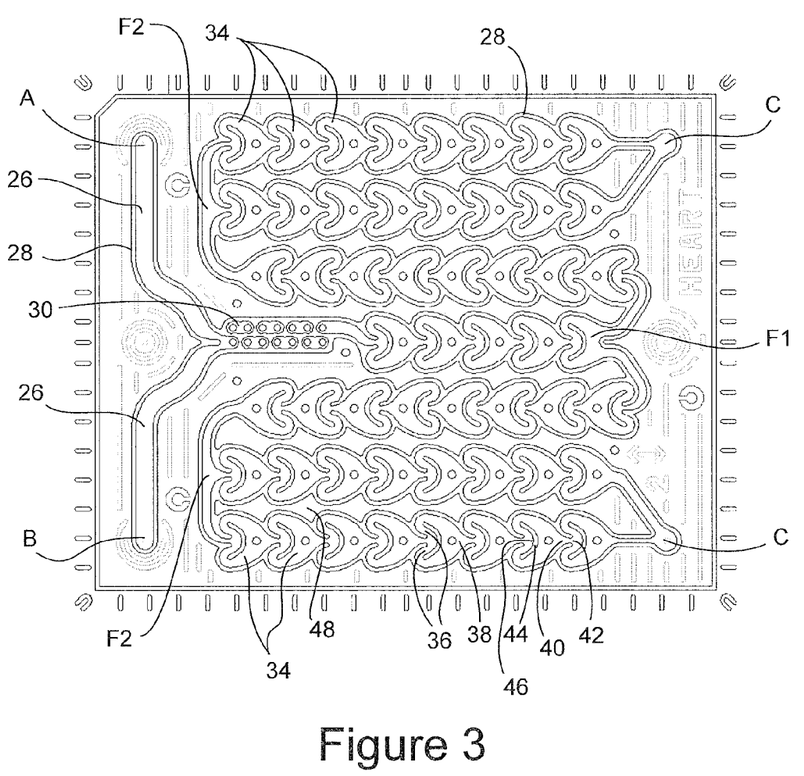
FIG. 3 is a cross-sectional plan view of vertical wall structures defining a reaction passage according to an embodiment of the present invention.

FIG. 3 is a cross-sectional plan view of vertical wall structures 28 within a microfluidic device according to an embodiment of the present invention. Vertical wall structures 28 define a reactant passage 26 that is positioned between two walls 18, 20 as in FIG. 1, which walls 18, 20 themselves form the reactant-passage-facing boundaries of volumes 12 and 14, in which are contained one or more thermal control passages (not shown). The walls 18, 20 are generally planar and parallel to each other.

In the embodiment of the invention shown in part in FIG. 3, reactants may be fed into the reactant passage(s) 26 at locations A and B, and flow out of the reactant passage at both locations C. The reactant passage is defined by said horizontal generally planar walls 18, 20, and walls 28, generally vertical in the orientation of FIG. 1, extending between said generally planar walls 18, 20. The reactant passage 26 comprises multiple successive chambers 34, each such chamber including a split of the reactant passage into at least two sub-passages 36, and a joining 38 of the split passages 36, and a change of passage direction, in at least one of the sub-passages 36, of at least 90 degrees relative to the immediate upstream passage direction. In the embodiment shown, it may be seen in FIG. 3 that both sub-passages 36 change direction in excess of 90 degrees relative to the immediate upstream passage direction of the reactant passage 26.

Also in the embodiment of FIG. 3, each of the multiple successive chambers 34, for those having an immediately succeeding one of said chambers, further comprises a gradually narrowing exit 40 which forms a corresponding narrowed entrance 42 of the succeeding chamber. The chambers 34 also include a splitting and re-directing wall 44 oriented crossways to the immediately upstream flow direction and positioned immediately downstream of the chamber's entrance 42. The upstream side of the splitting and re-directing wall 44 has a concave surface 46. The narrowing exit 40 from one chamber 34 to the next is desirably on the order of about 1 mm width. The channel desirably may have a height of about 800 μm.

The successive chambers 34 that make up a significant portion of the reactant passage 26 of the embodiment of a microfluidic device represented in FIG. 3. The chambers 34 desirably have a constant height H, shown in FIG. 1, in a direction generally perpendicular to the walls 18 and 20, which height H generally corresponds to the distance between the walls 18 and 20. In other words, the portion of passage 26 having the chambers 34 generally occupies the maximum space possible in the direction of height H, matching the maximum dimension of the volume 24 in the direction of H. This is significant because (1) the volume of a given lateral size microfluidic device is thus maximized, allowing longer residence times at higher throughput rates and (2) the amount of material and distance between reactant passage 26 and the volumes 12 and 14 in which one or more thermal control fluid passages are contained is minimized, allowing for greater heat transfer. Further, although the height H may desirably be on the order of 800 μm to in excess of a few millimeters, the thickness of boundary layers in the direction of H are generally reduced by secondary flows induced within the reactant passage by passing of the reactant fluid through the directional changes caused by the splitting and re-directing walls 44, and by repeated passage though gradually narrowing exits 40 into the wider space of the successive chambers 43.

For devices in which heat exchange and residence time is to be maximized, it is desirable that the multiple successive chambers 34 extend along at least 50% of the total volume of the reactant passage 26, more desirably at least 75% or more, as is the case in the embodiment of FIG. 3.

As may also be seen in the embodiment of the present invention in FIG. 3, the successive chambers 34 desirably share common walls with the next chambers in the up- and down-stream directions. This helps assure that the maximum number of chambers 34 is positioned within a given space, and thus also maximizes the volume of the reactant passage 26 as a fraction of total volume available between the walls 18, 20. In particular, it is desirable that the reactant passage 26 has an open volume of at least 30% of the total volume consisting of (1) said open volume (2) the volume of the wall structures 28 that define and shape the reactant passage between the horizontal walls 18, 20, and (3) any other volume such as empty volume 48 between the wall structures 28 that define and shape the reactant passage 26. More desirably, the reactant passage has open volume of at least 40%. The successive chambers 34 generally desirably do not share common walls with other such chambers not immediately up or downstream, as is such case thermal cross-talk may more easily take place between chambers 34 that are widely separated along the path of the reactant passage 26. Such cross talk can affect the performance of thermally sensitive reactions. Empty volume 48 thus serves to reduce the likelihood of any significant thermal cross talk.

The narrow tortuous passage 30 portion of the reactant passage 26, when present in a device of the present invention as in the embodiment of FIG. 3, may desirably be of less length than corresponding passages 30 of prior art devices such as the device of FIG. 2. Despite the shorter length of the narrow tortuous section 30 of the device of FIG. 3 relative to that of FIG. 2, it has been found by the applicants, that when placed in combination with the successive chambers 26 of the present invention, to mix as well at low throughput but, and better at higher throughput, relative to the prior art device of FIG. 2, and with lower pressure drop in every case.

As yet another feature of the embodiment of the present invention shown in FIG. 3, the reactant passage 26 divides or forks into two passages twice, first at location F1, and second at locations F2. This counterbalances the decrease of the driving force of the chemical process by locally increasing the residence time. Additionally, the pressure drop within the latter stages of the device decreases correspondingly.

Comparative Tests

Figure 4:
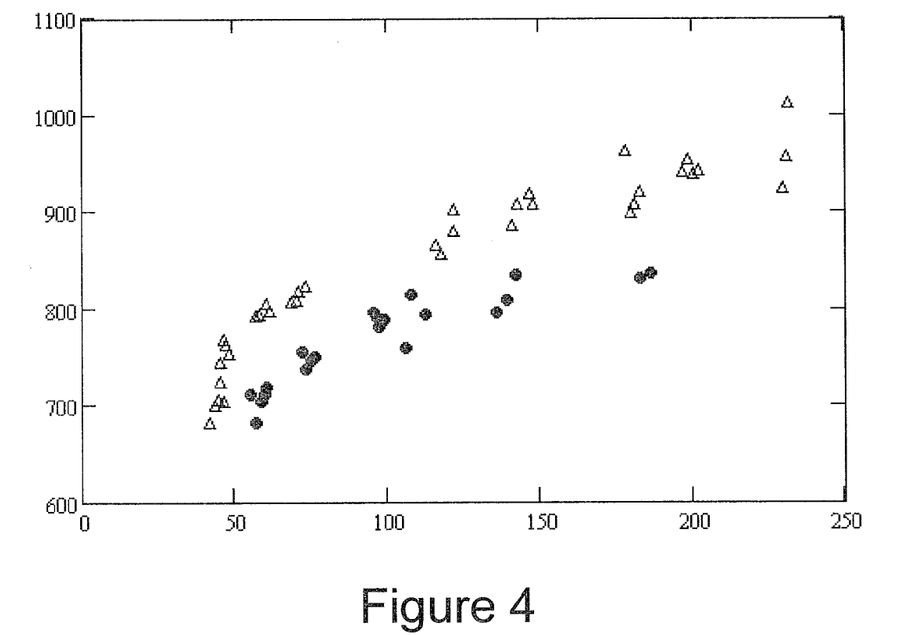
FIG. 4 is a graph of overall heat transfer coefficient in watts per meter-squared and Kelvin as a function of flow rate in milliliters per minute, comparing an embodiment of the invention to a prior art device.

FIG. 4 is a graph of measured overall heat transfer coefficient in watts per meter-squared and Kelvin as a function of flow rate in milliliters per minute, comparing the embodiment of the present invention represented in FIG. 3, with data points shown as open triangles, to the device of FIG. 2, with data points shown as filled circles. As may be seen from the graph, the secondary flows produced by the structures shown in FIG. 3 produce a heat transfer advantage of about 50 to 100 W/m²K at all flow rates tested. Both of the tested devices were of the same general dimensions and capacities, with a total internal volume of the reactant passage in each case of 5.6±0.1 milliliter. Thus the superior performance of the device of the present invention is clearly established, even though heat exchange performance typically decreases with flow rate and the forking of the reactant passage at F1 and F2 effectively halves the local flow rate two times. The improved heat exchange performance even in the presence of lower flow rates shows that process intensification has been achieved by the devices of the present invention, even relative to the comparative device of FIG. 2 which is already a microfluidic device.

Figure 5:
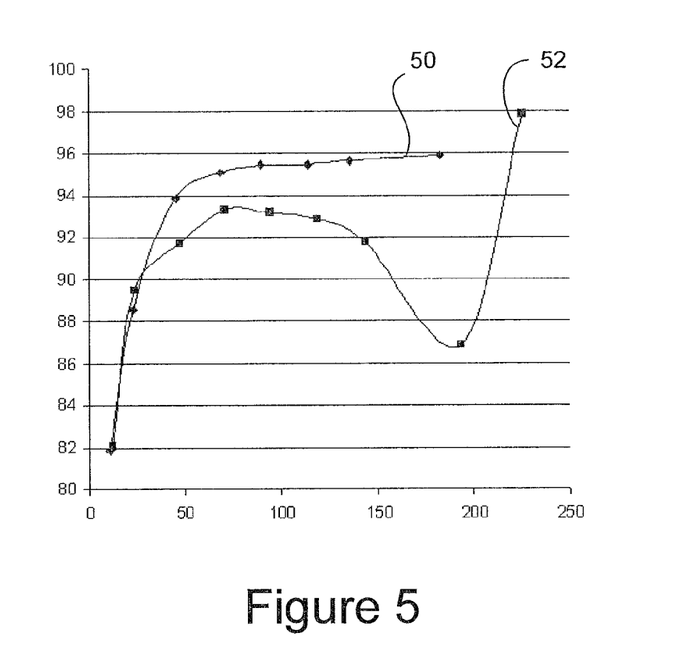
FIG. 5 is a graph of percentage mixing performance of a test reaction in a micromixer device as a function of flow rate in milliliters per minute, for an embodiment of the invention and a comparative device.

FIG. 5 is a graph of percentage mixing performance of a test reaction in a micromixer device as a function of flow rate in milliliters per minute, comparing the embodiment of the present invention described in connection with FIG. 3 above to the device described in connection with FIG. 2. The testing method is similar to that of Villermaux J., et al. "Use of Parallel Competing Reactions to Characterize Micro Mixing Efficiency," AIChE Symp. Ser. 88 (1991) 6, p. 286. For testing generally as described herein, the process was to prepare, at room temperature, a solution of acid chloride and a solution of potassium acetate mixed with KI (Potassium Iodide). Both of these fluids or reactants were then continuously injected by means of a syringe pump or peristaltic pump into the micromixer or microreactor to be tested. The resulting test reaction involves two competing reactions of different speeds—a "fast" reaction that produces a UV-absorbing end product, and an "ultrafast" one that dominates under ultrafast mixing conditions, producing a transparent solution. Mixing performance is thus correlated to UV transmission, with theoretically perfect or 100% fast mixing yielding 100% UV transmission in the resulting product.

The graph of FIG. 5 accordingly shows the resulting percentage transmittance as a function of total reactants flow rate. Trace 50 corresponds to the mixing performance of the embodiment of the present invention corresponding to FIG. 3, while trace 52 corresponds to the performance of the comparative device corresponding to FIG. 2. As shown in the figure, the mixing performance of the embodiment of the present invention is superior, especially at higher flow rates. This is the case even though the embodiment of the present invention of FIG. 3 tested also produces less pressure drop than the reference device of FIG. 2. This again shows the achievement of increased process intensification relative to the device of FIG. 2.

Figure 6:
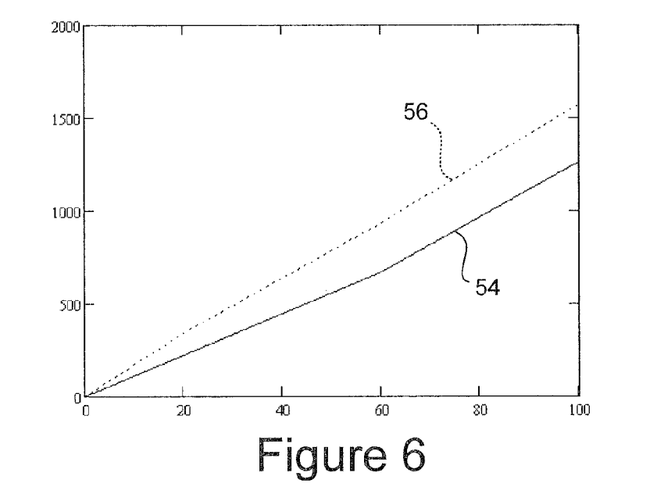
FIG. 6 is a graph of pressure drop across a microfluidic device in millibar, as a function of flow rate in milliliters per minute, for an embodiment of the invention and a comparative device (using a glucose solution of 13 centiPoise)

Pressure drop results are shown in FIG. 6, with trace 54 showing the lower pressure drop of the device of the present invention, and trace 56 showing the higher pressure drop of the comparative device (using a glucose solution of 13 centiPoise).

Figure 7:
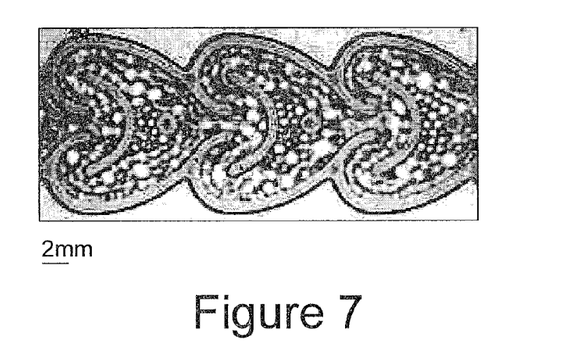
FIG. 7 is a digital photograph showing preservation of an emulsion of immiscible liquids in testing of an embodiment of a microfluidic device according to the present invention.
Figure 8:
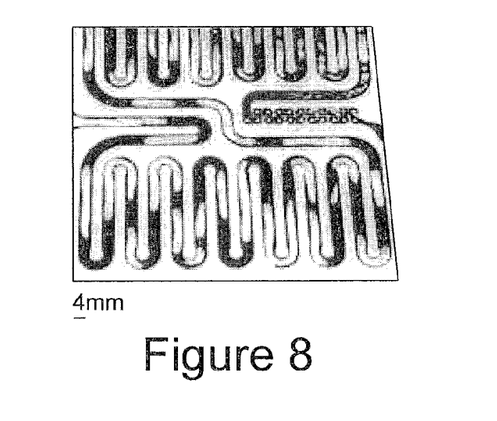
FIG. 8 is a digital photograph showing coalescing of immiscible liquids in testing of a comparative microfluidic device with the same experimental conditions as FIG. 17.

FIGS. 7 and 8 dramatically show the comparative advantage of the devices according to the present invention in maintaining dispersions or mixtures of immiscible fluids. FIG. 7 shows a portion of digital photograph of a device according to the embodiment of FIG. 3 above, tested by being fed equal parts colored water and non-colored heptane at a flow rate for each liquid of 10 milliliters per minute. As shown in the figure, the water and heptane mixture remains well dispersed as it travels from chamber to chamber within this example of a device according to the present invention. Devices according to the present invention have also shown efficiency in dispersing and/or maintaining dispersion of a gas in a liquid.

FIG. 8 shows a portion of a digital photograph of a comparative device according to FIG. 2 above, also being tested with colored water and heptane at 10 milliliters per minute each. As may be seen in the figure, the two immiscible liquid phases coalesce within the passages of the comparative device.

Figure 9:
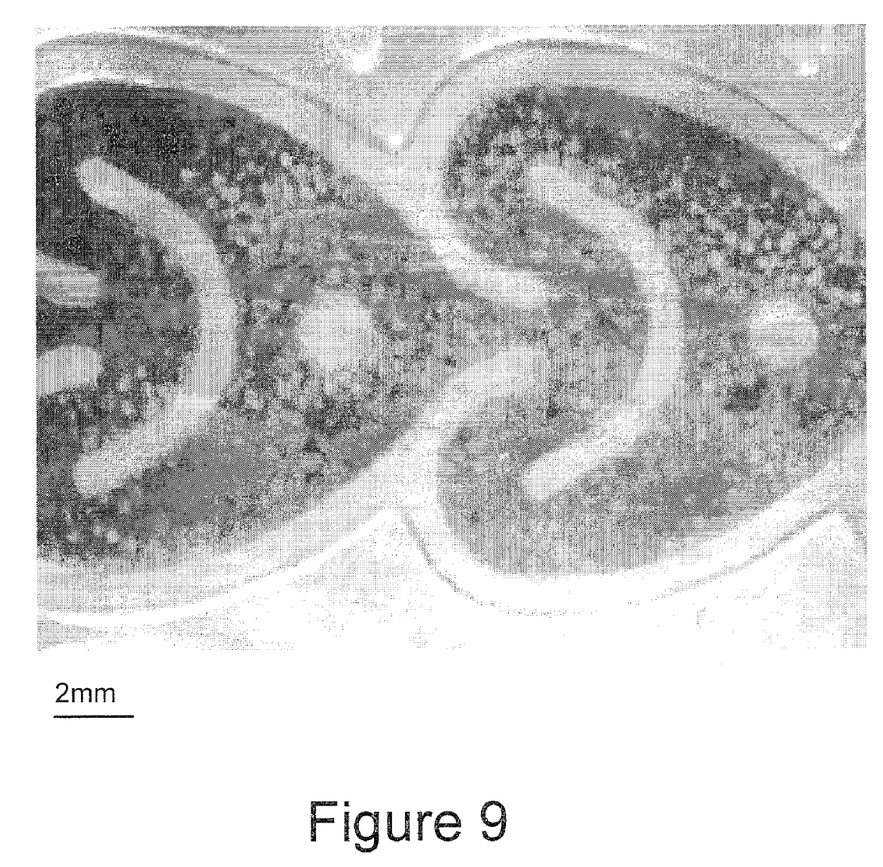
FIG. 9 is another digital photograph showing preservation of an emulsion of immiscible liquids in testing of an embodiment of a microfluidic device according to the present invention, but at a higher flow rate than in FIG. 7, with resulting smaller droplets.

Devices according to the present invention can generally create and maintain dispersions or mixtures of immiscible fluids over a wide range of flow rates. Higher flow rates may be used to produce finer dispersions. FIG. 9 shows a portion of a digital photograph of a device according to the embodiment of FIG. 3 above, with 54 milliliter per minute water flow and 51 milliliter per minute heptane. The light colored granules in the photograph are the small, relatively uniform and well-dispersed heptane droplets.

Some Additional Embodiments

FIGS. 10A-10G are cross-sectional plan views of multiple alternative wall structures defining portions of reaction passages according to some alternative embodiments of the present invention, in particular, defining alternative forms of the successive chambers 34. The chambers shown in the embodiments above generally correspond to those of FIG. 10F, wherein a post 58 may potentially serve to increase the pressure resistance of the chamber 34 relative to a chamber 34 having a larger open area or "free span" as in the embodiment of FIG. 10A. On the other hand, embodiments without the post 58 may have less tendency toward having a small dead volume (a slow moving spot in the fluid flow pattern) upstream of the post 58. The embodiment of FIG. 10G essentially avoids all risk of dead volume by including a triangular backing structure 60 on the downstream side of the splitting and re-directing wall 44, being therefore particularly recommended for handling solids such as solid suspensions or precipitating reactions, which can tend to collect in areas of dead volume to clog a reactant passage.

Figure 10:
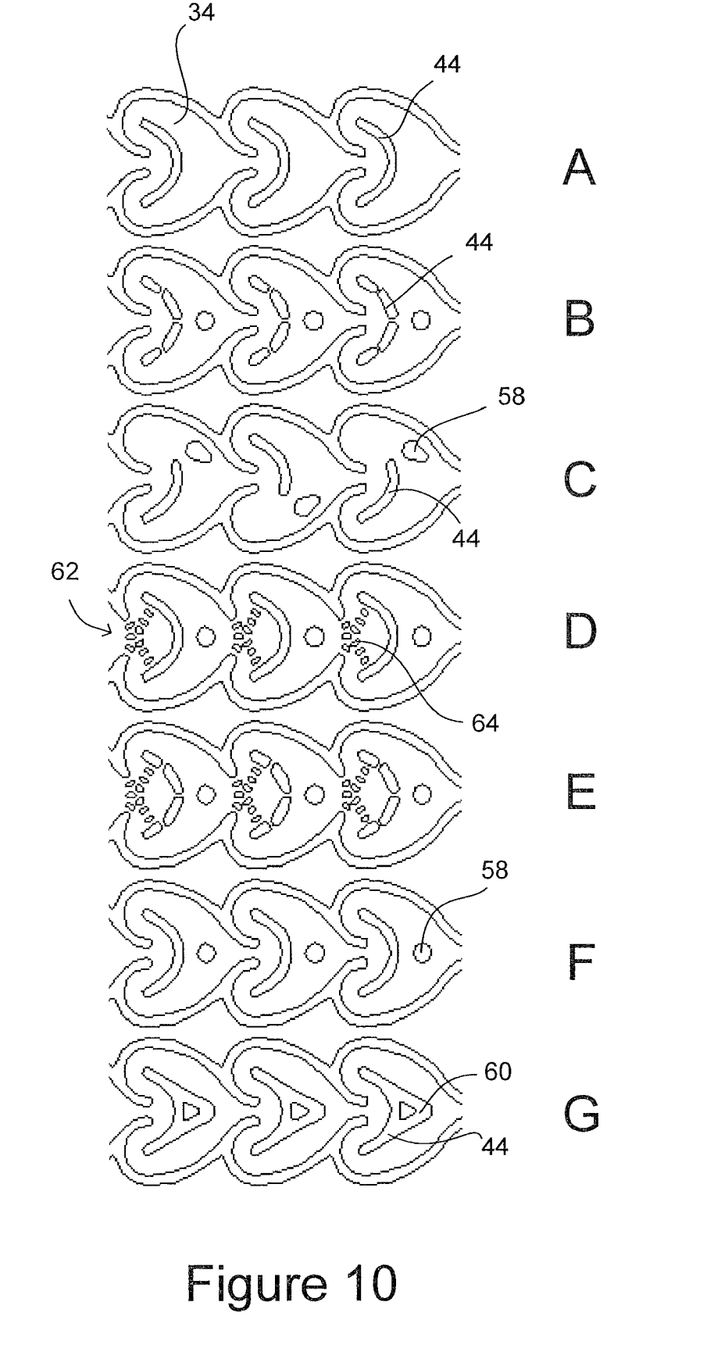
FIGS. 10A-10G are cross-sectional plan views of multiple alternative vertical wall structures defining portions of reaction passages according to some alternative embodiments of the present invention.

In the embodiment of FIG. 10B, the splitting and re-directing wall 44 is segmented in four segments, thus dividing the reactant passage into two main sub-passages around the splitting and re-directing wall 44 and three secondary sub-passages between the segments of the wall 44. The small size of the secondary sub-passages can help to maintain fine emulsions.

In the embodiment of FIG. 10C, the splitting and re-directing wall 44 is asymmetrical, being offset to alternating sides in successive chambers 43 so as to provide especially strong secondary flows. The post 58 is also offset from the center of the chamber 43 in alternating fashion, and by being positioned in the larger of the two sub-passages formed by the wall 44, the post 58 serves as an additional flow divider.

The embodiments of FIGS. 10D and 10E correspond to those of 10F and 10B, respectively, with the following difference: the gradually narrowing exit 40 of the previously discussed embodiments is replaced by a wider exit 62 filled with small secondary flow dividers 64 positioned to as to finely divide the incoming flow to the chamber 43, thereby assisting to create and maintain an emulsion or other immiscible mixture.

Figure 11:
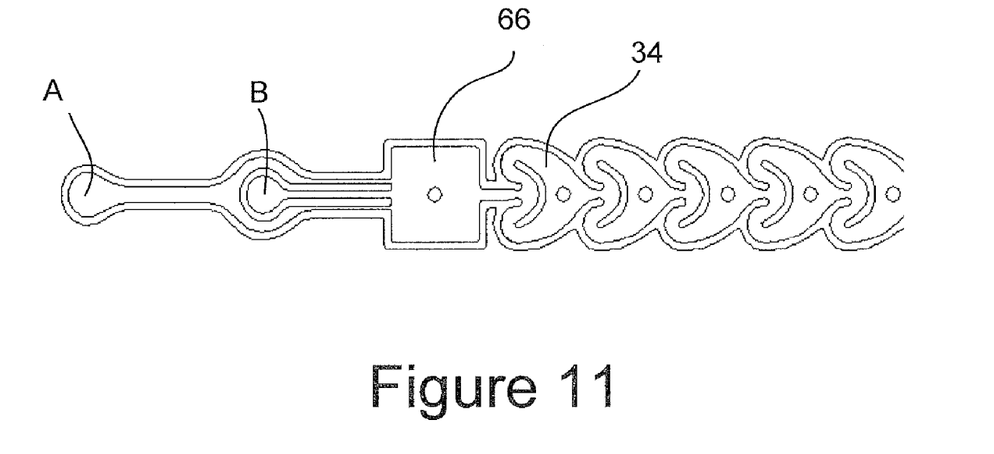
FIG. 11 is a cross-sectional plan view of vertical wall structures defining a portion of a reaction passage according to yet another embodiment of the present invention.

FIG. 11 is a cross-sectional plan view of vertical wall structures defining a portion of a reaction passage according to yet another embodiment of the present invention. This embodiment illustrates that the structure of successive chambers 34 utilized in the devices of the present invention may be used in conjunction with other types of mixing devices, such as, in this case, a self-sustaining oscillating mixer chamber 66.

Figure 12:
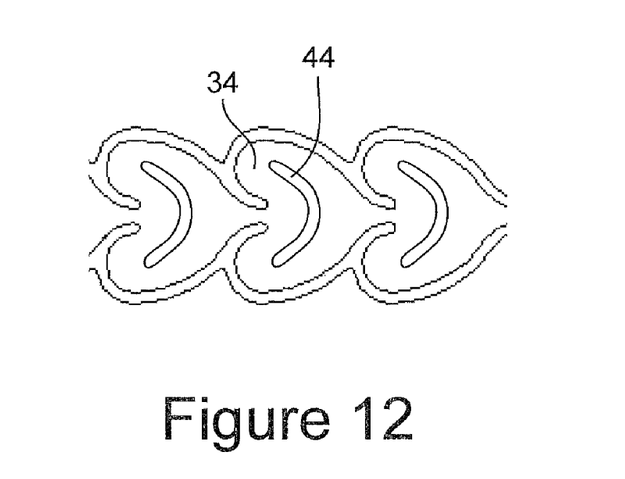
FIG. 12 is a cross-sectional plan view of alternative vertical wall structures defining portions of a reaction passage according to yet another alternative embodiment of the present invention.

FIG. 12 shows yet another embodiment of the chambers 34 of the present invention, in which the splitting and re-directing wall 44 is space further from the upstream entrance to the chamber 34 than in some of the previously discussed embodiments.

Additional Comparative Tests

Figure 13:
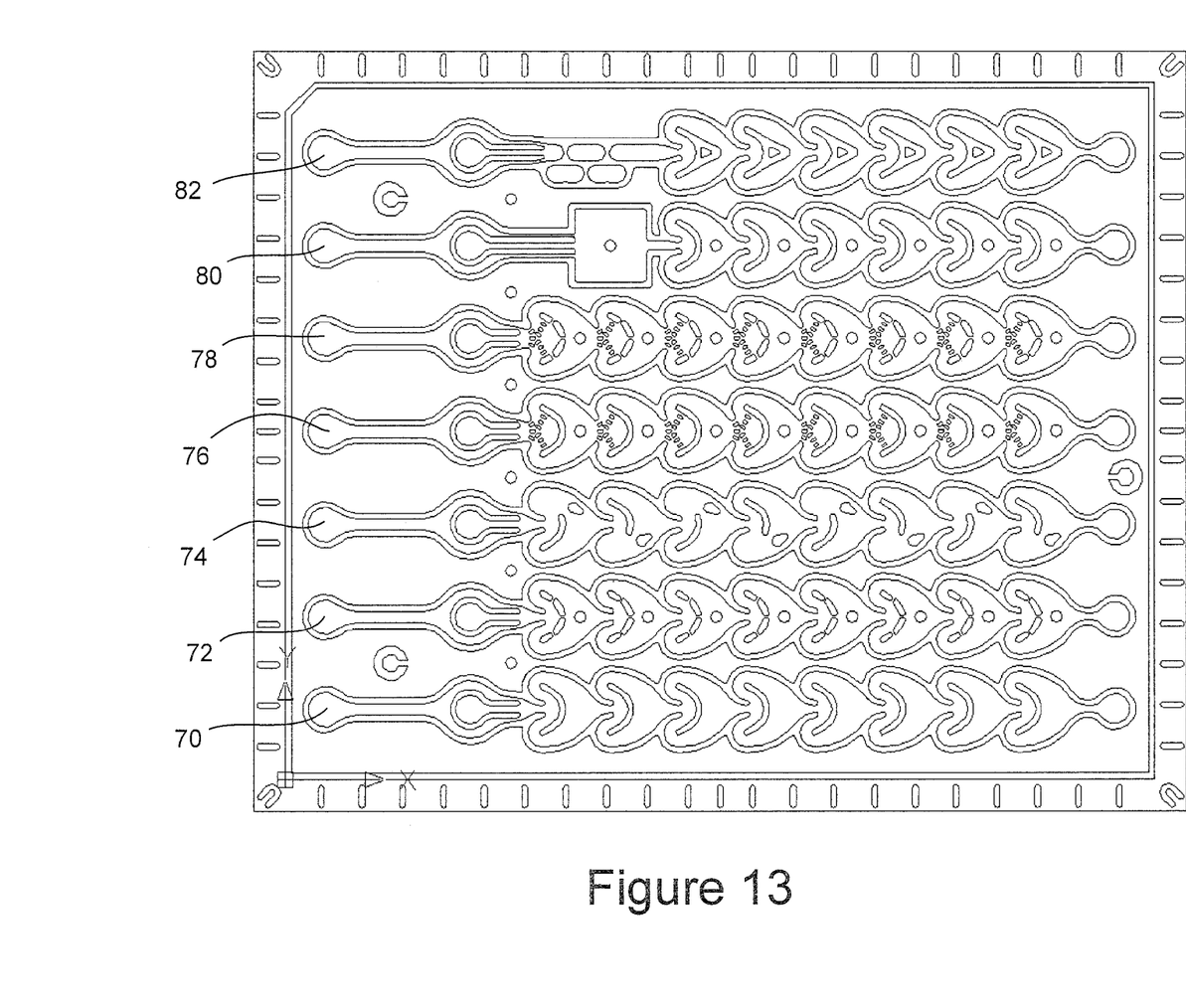
FIG. 13 is a cross-sectional plan view of multiple test reaction passages according to various alternative embodiments of the present invention corresponding generally to those shown in FIG. 9, laid out as part of a single test device.

FIG. 13 is a cross-sectional plan view of multiple test reaction passages according to various alternative embodiments of the present invention corresponding generally to those shown in FIG. 9, laid out as part of a single device. The mixing test referenced above was performed with each of the test reaction passages 70-82 shown in the figure. The results, together with a comparative test of the device of FIG. 2, are shown in the following TABLE I:

TABLE I

| Passage | Volume (ml) | Δp (mbar) | Mixing quality (%) | | | |
|---|---|---|---|---|---|---|
| | | | 100 (ml/m) | 200 (ml/m) | 250 (ml/m) | 300 (ml/m) |
| 70 | 0.98 | 183 | 97.8 | 99.1 | 99.4 | 99.5 |
| 72 | 0.93 | 175 | 96.7 | 98.3 | 99.0 | 99.2 |
| 74 | 0.92 | 177 | 97.2 | 98.7 | 99.1 | 99.2 |
| 76 | 0.91 | 112 | 97.7 | 98.1 | 98.1 | 98.2 |
| 78 | 0.94 | 79 | 91.9 | 94 | 94.3 | 94.8 |
| 80 | 0.88 | 162 | 95.3 | 95.7 | 96.0 | 96.2 |
| 82 | 0.8 | 206 | 97.9 | 98.5 | 98.3 | 97.6 |
| Comparative | 5.83 | 665 | 98 | 95 | 91.5 | — |

As may be seen in the table, the various embodiments of the present invention shown in FIG. 13 all show better mixing performance, at flow rates of 250 milliliters per minute and up, than the device of the type shown in FIG. 2, and with less pressure drop (Δp), even once allowances are made for the differing internal volumes. Some of the embodiments, test passages 70, 76, and 82, in particular, are essentially identical in mixing performance to the device of FIG. 2 at 100 milliliters per minute, and are superior at all higher flowrates. This result is further significant in that embodiments without a "mixing zone" as such, including test passages 70 and 76, performed as well as, or better than microfluidic devices having a special mixing section. Thus it is clear that the chambers of the present invention may be used effectively as mixers as well, without the need for narrow, tortuous passages or other forms of mixer device.

Tests were also performed to understand the solids handling capability of the devices of the current invention. Using the following reaction: $FeCl_3(H_2O)_6 + 3NaOH \rightarrow Fe(OH)_3 + 6H_2O + 3NaCl$ to form an iron oxide precipitate, the time elapsed until reaching a pressure of 0.7 bar was recorded. A device according to the present invention, including a large number of chambers but not a pre-mixing or other mixing section, was tested in comparison with a device according to FIG. 2 above. TABLE II below shows the results:

TABLE II

| | Q NaOH (g/min) | Q FeCl3 (g/min) | Ratio | Time to 0.7 bar (sec) |
|---|---|---|---|---|
| Test device | 30 | 11 | 2.7 | 394 |
| Comparative | 30 | 11 | 2.7 | 25 |

Figure 14:
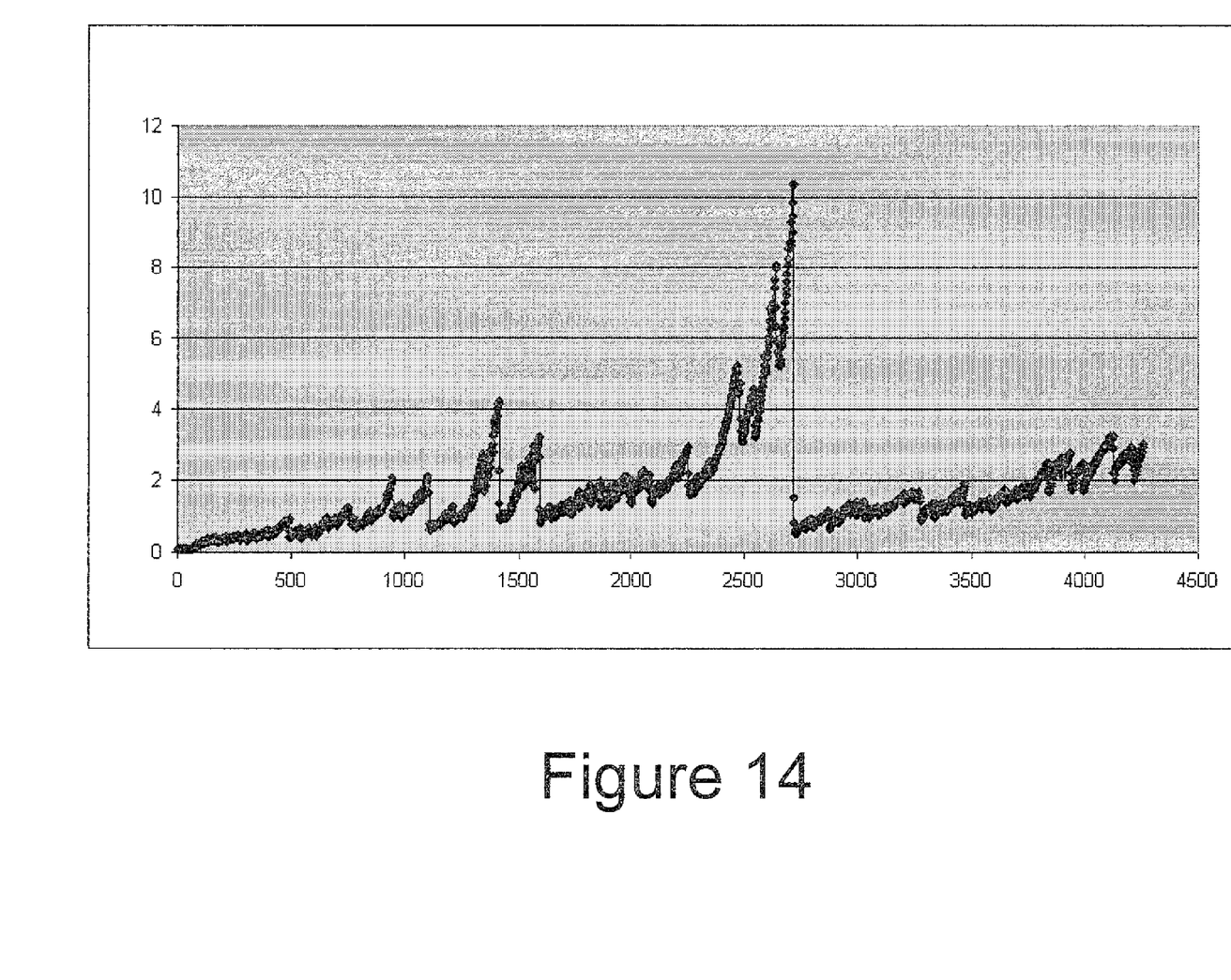
FIG. 14 is a graph of pressure in bar as a function of time during solids handling testing of an embodiment of a device according to the present invention.

Furthermore, with the driving pressure ramping only once up to about 11 bar to clear temporary blockages, the inventive device stayed unclogged for well beyond the duration of any other devices tested, and indeed lasted beyond the timeframe of the 70 (seventy) minute test, the results of which are graphed in FIG. 14, with pressure in bar shown as a function of time in seconds. As may be seen in the figure, despite a pressure spike of up to about 11 bar in order to clear built-up precipitates, the device according to the present invention never clogged for the duration of the test, showing even a tendency for auto-cleaning.

Figure 15:
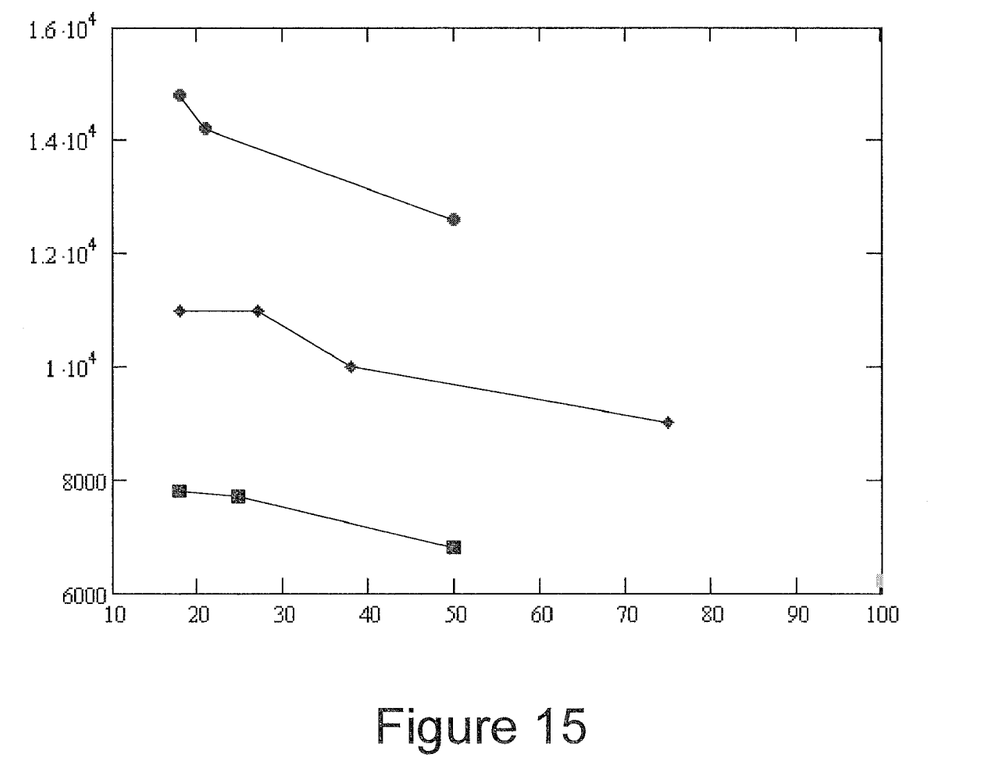
FIG. 15 is a graph of specific interfacial area (squared-meter per cubic-meter) as a function of gas injection flowrate in milliliters per minute on the x axis for three different water flow rates as tested in an embodiment of the present invention.

The devices of the type of the present invention were also tested for suitability of Gas/Liquid reactions, by flowing water and nitrogen together at various combinations of flow rates. It was observed that the bubbles of gas remain stable, once created. Specific interfacial area of the gas/liquid dispersion was assessed by a visual method, and is graphed in FIG. 15 as a function of gas injection rate on the x axis for water flow rates of 50 milliliters (squares) 75 milliliters, (diamonds) and 100 milliliters per minute (circles). At 100 milliliters per minute, the specific surface area is at least in excess of 12000 m2/m3, with in excess of 14000 m2/m3 available at lower gas flows. The specific surfaces quoted here represent, in fact, a fraction of the real value (the bubbles with less than 50 µm in diameter could not be counted)—and this fraction is believed to be between 30% and 60% of the true total. These values compare very favorably with other processes used for gas-liquid reacting: Agitated tanks typically have less than 220, bubble columns less than 600, impinging jets less than 2000, with Micro Bubble Column at 14800 and Falling Film MicroReactor at 27000 m2/m3 (see Jahnisch et al. "Direct fluorination of toluene using elemental fluorine in gas/liquid microreactors" Journal of Fluorine Chemistry, 105 (2000), p. 117.)

Embodiments of devices according to the present invention were also tested for their pressure limits. Results for the device of FIG. 3 and comparative results for the device of FIG. 2 are summarized in the following table:

TABLE III

|  | Reactant Passage | Thermal Control Passage |
|---|---|---|
| Test device (five samples) | 60.5 bars | 26 bars |
| Comparative | 52 bars | 21 bars |

The microfluidic devices according to the present invention are desirably made from one or more of glass, glass-ceramic, and ceramic. Processes for preparing such devices from glass sheets forming horizontal walls, with molded and consolidated frit positioned between the sheets forming vertical walls, are disclosed, for example, in U.S. Pat. No. 7,007,709, "Microfluidic Device and Manufacture Thereof," but fabrication is not limited to this method. The devices of the present invention may also include layers additional to those shown, if desired.

"Reactant" as used herein is shorthand for potentially any substance desirable to use within a microfluidic device. Thus "reactant" and "reactant passage" may refer to inert materials and passages used for such.

What is claimed is:

1. A microfluidic device comprising at least one reactant passage and one or more thermal control passages defined therein, the one or more thermal control passages being positioned and arranged within two volumes each bordered by a wall, the walls being generally planar and parallel to one another, the reactant passage positioned between said generally planar walls and defined by said generally planar walls and walls extending between said generally planar walls, wherein the reactant passage comprises multiple successive chambers, each such chamber including a split of the reactant passage into at least two sub-passages, and a joining of the split passages, and a change of passage direction, of at least one of the sub-passages, of at least 90 degrees, wherein each of the multiple successive chambers being immediately succeeded by another one of said chambers further comprises a gradually narrowing exit which forms a corresponding narrowed entrance of the succeeding chamber, and a splitting and re-directing wall oriented crossways to the immediately upstream passage and positioned immediately downstream of the chamber's entrance, the upstream side of said splitting and re-directing wall having a concave surface.

2. The microfluidic device according to claim 1 wherein the change of passage direction is greater than 90 degrees.

3. The microfluidic device according to claim 1 wherein the change of passage direction is a change of passage direction of at least two of the sub-passages.

4. The microfluidic device according to claim 1 wherein the reactant passage has a constant height in a direction perpendicular to the generally planar walls.

5. The microfluidic device according to claim 1 wherein the reactant passage has an open volume of at least 30% of the total volume consisting of (1) said open volume (2) the volume of the walls extending between said generally planar walls, and (3) any other volume between the walls extending between said generally planar walls.

6. The microfluidic device according to claim 1 wherein the reactant passage has an open volume of at least 40% of the total volume consisting of (1) said open volume (2) the volume of the walls extending between said generally planar walls, and (3) any other volume between the walls extending between said generally planar walls.

7. The microfluidic device according to claim 1 wherein the two or more sub-passages include at least two primary and one or more secondary sub-passages.

8. The microfluidic device according to claim 1 wherein the device is formed of one or more of glass, glass-ceramic, and ceramic.

9. The microfluidic device according to claim 1 wherein the multiple successive chambers extend along at least 30% of the volume of the reactant passage.

10. The microfluidic device according to claim 1 wherein the multiple successive chambers extend along at least 50% of the volume of the reactant passage.

11. The microfluidic device according to claim 1 wherein the multiple successive chambers extend along at least 75% of the volume of the reactant passage.

12. The microfluidic device according to claim 1 wherein the reactant passage forks into at least two branches one or more times.

* * * * *